Patented Dec. 2, 1952

2,620,362

UNITED STATES PATENT OFFICE 2,620,362

METHOD OF CATALYTICALLY REMOVING SULFUR

Alvin B. Stiles, Charleston, W. Va., assignor to E. I. du Pont de Nemours & Company, Wilmington, Del., a corporation of Delaware No Drawing. Application July 7, 1948, Serial No. 37,501

4 Claims. (Cl. 260—674)

This invention relates generally to the production of purified aromatic hydrocarbons, and especially benzene and its homologues such as toluene, xylene, etc. The invention also relates to the recovery of aromatic hydrocarbons of high purity from light oils produced by the distillation of coal tar, oil tar and other similar bodies as well as the light oils produced by washing coal gas which are unusually rich in benzene.

In the ordinary production of commercial benzene, toluene, xylene, etc., these compounds are invariably contaminated with organic sulfur and especially with thiophene. While sulfur contaminants of this nature have no particularly bad influence upon a number of uses for which the hydrocarbons are adapted, it is generally necessary, if the hydrocarbons are to be used in chemical processes, to remove the sulfur down to at least 10 p. p. m. prior to use. A number of processes have been proposed for this purpose, but none of them is effective in removing thiophene from benzene without, to a greater or lesser degree, decomposing, hydrogenating, or otherwise degrading the benzene.

It is an object of this invention to overcome these and other disadvantages of the prior art processes and to provide a new and improved process for the substantially complete removal of sulfur-containing compounds, and more particularly thiophene from thiophene-contaminated hydrocarbons. Another object is to provide a catalyst highly active for thiophene removal from gases. Yet another object is to provide an overall process for the removal of thiophene and other organic sulfur compounds such as, carbon disulfide from benzene and homologues thereof. Other objects and advantages of the invention will hereinafter appear.

According to the invention, sulfur, in its various forms, can be removed from hydrocarbon gases by passing the contaminated hydrocarbon in the vapor phase over a supported and sulfided metal salt of an amphoteric metal of the 5th or 6th groups of the periodic table and more specifically over a vanadate, chromate, molybdate or tungstate of such metals as the alkaline earth metals, silver and the metals of the iron group, especially iron, nickel or cobalt.

The metal salts of the aforesaid amphoteric metals may be made in accord with any well known process for preparing metal salts. For example, a water soluble salt such as a chloride, hydroxide, nitrate, oxalate, formate or acetate of the non-amphoteric metal is made and such a salt combined chemically with an acid, ammonium, or alkali metal salt of the amphoteric metal, and more especially with the sodium salts of chromium, vanadium, molybdenum and tungsten. In the preferred cases, when these salts are combined, a precipitate forms between the non-amphoteric metal and the amphoteric metal to give a salt from which the catalyst is prepared. After precipitation, the precipitate is washed free from undesirable acidic constituents, the washed precipitate is slurried in distilled water, and a sufficient amount of ammonia or ammonia hydroxide solution added to dissolve completely the precipitate. The resulting ammoniacal solution of the metal salt of the amphoteric metal is used directly for impregnating a support. If no precipitate forms, such as in the case of potassium tungstate, the solution is used directly without ammonia addition to impregnate the support.

The catalysts of the invention may be and are preferably made by a three-step process. In the first step, the salt is prepared by any suitable process for making a soluble metal salt of one of the aforesaid amphoteric metals. In the second step, this salt is thoroughly and uniformly dispersed in a suitable support. The next step of the process involves sulfiding this supported metal salt, the sulfiding operation resulting in a partially or completely sulfided catalyst. On the sulfiding step depends the ultimate activity of the catalyst for without this treatment the catalysts are less active and have shorter halflives. After preparation, which includes the incidental operation of washing, drying, etc., the sulfided metal salt is disposed in a suitable converter and the sulfur contaminated hydrocarbon to be purified passed in the vapor phase over the catalyst. The catalysts thus prepared are so highly active as sulfur removal catalysts that only inconsequential amounts of sulfur remain associated with the hydrocarbon after it passes the catalyst.

The examples which follow illustrate preferred methods of preparing the catalyst and using it in the purification of hydrocarbons. The proportions given are in parts by weight unless otherwise indicated.

*Example 1.—Preparation of the catalyst*

Two hundred and fifty ml. of a two molar solution of nickel nitrate was added to 250 ml. of a one molar solution of sodium molybdate $Na_2MoO_4$ to give a precipitate, nominally $2NiO:MoO_3$. The nickel molybdate precipitate was washed by decantation and was finally filtered and washed on the filter to remove the sodium nitrate and any uncombined nickel nitrate. The precipitate was slurried in distilled water and sufficient 28% ammonium hydroxide solution was added to dissolve completely the nickel molybdate. The resulting 450 ml. of solution was heated to boiling and 350 ml. of 10 mesh activated coconut shell carbon was added to the solution and the mixture was boiled for an additional ten minutes. After standing for 50 minutes the excess liquid was drained from the impregnated carbon which was thereafter dried at 125° C. for 16 hours. The carbon picked up nickel and molybdenum oxides equal to 12% of the original weight of the carbon.

Example 2

A solution of ammoniacal ammonium molybdate was made by dissolving 49 grams of ammonium molybdate $(NH_4)_6Mo_7O_{24}.4H_2O$ in 300 ml. of 5% aqueous ammonia solution. A second solution was made up of ammoniacal nickel chloride by dissolving 119 grams $NiCl_2.6H_2O$ in 300 ml. of 5% aqueous ammonia solution. The molybdate solution was then added to the nickel solution and then 60 ml. of 28% aqueous ammonia was added to the combined solutions to dissolve any precipitate resulting from mixing of the solutions. The ammoniacal solution was next heated to boiling and 350 ml. of granular activated carbon derived from bituminous coal was added to the solution. Boiling was continued for ten minutes, then excess liquid was drained from the granules which were thereafter dried at 110° C. for 16 hours. Ammonium chloride which was a product of the nickel molybdate preparation was removed from the catalyst granules by heating to 350° C. for three hours. The carbon picked up nickel and molybdenum oxides equivalent to 11% of the weight of the carbon.

Example 3

A preparation was made exactly as described in Example 2 with the exception that granular Alorco Grade F-10 activated alumina was substituted for the activated carbon. Nickel molybdate equivalent to 9% of the weight of the activated alumina was picked up by the alumina.

Example 4

A catalyst was prepared as described in Example 1 except that cobalt nitrate was substituted for the nickel nitrate. The quantity of cobalt molybdate retained by the activated carbon was equivalent to about 15% of the weight of the carbon.

Example 5

A catalyst was prepared by impregnating 120 grams of 10 to 16 mesh activated carbon with ammonium paratungstate. The excess liquid was drained from the carbon granules which were thereafter dried at 110° C. for 16 hours. A weight of tungstate equivalent to 10% of the weight of the carbon was retained by the carbon.

Example 6

A catalyst was prepared as described in Example 5 except that ammonium vanadate was used instead of the ammonium tungstate. Vanadate equivalent to 10% of the weight of the carbon was retained by the carbon.

Example 7

A silver molybdate catalyst was prepared by impregnating 120 grams of 10 to 16 mesh activated carbon by slurrying the activated carbon in a boiling solution of 5% ammonium molybdate. The excess liquid was drained from the granules which were thereafter dried. The granules, impregnated with ammonium molybdate were thereafter further impregnated by slurrying in a 5% solution of silver acetate at 25° C. in a flask to which a vacuum pump was connected. The flask was successively evacuated to 10 mm. absolute pressure then allowed to increase in pressure to atmospheric. The evacuation was repeated two times to fill the pores of the activated carbon. The excess liquid was drained from the granules which were then dried. The activated carbon had retained silver and molybdenum, presumably as silver molybdate, equivalent to 22% of the weight of the carbon.

Examples 8.—Sulfiding and operating the catalyst

The dried nickel molybdate of Example 1 on activated carbon was charged into a glass tube externally heated by a Nichrome wire coil. The bed of catalyst was 1.25 inches in diameter and 14 inches long, and was heated to 350° C. A mixture composed of 75% hydrogen and 25% hydrogen sulfide was passed through the catalyst at a rate of about 500 ml. per minute. Although sulfiding of the catalyst can be effected with hydrogen sulfide alone, a more rapid sulfiding and a more active catalyst was obtained if hydrogen was present. Actually some of the hydrogen was consumed apparently in reducing the molybdenum oxide. There was evidence that the valence of the molybdenum was reduced from six to four or three during the sulfiding. Hydrogen sulfide treatment was continued until that gas appeared in the off-gas. The appearance of hydrogen sulfide was determined by passing the off-gas through a bubble bottle charged with a solution of cadmium chloride to which had been added a small amount of sodium hydroxide.

After the catalyst had been sulfided, a mixture composed of vaporized crude benzene (for example, benzene containing 200 p. p. m. of thiophene and 200 p. p. m. of carbon disulfide) and 10 to 30% hydrogen was passed over the catalyst at 350° C. and at a space velocity of 200 to 350 volumes per minute with respect to the benzene. After passing through the converter, the benzene was condensed and the hydrogen passed through a bubble bottle containing cadmium chloride solution. The cadmium chloride slurry rapidly turned yellow indicating that cadmium sulfide was being precipitated by hydrogen sulfide in the gas stream. Analyses of the effluent benzene for sulfur by the total combustion method indicated that the sulfur content of the benzene was reduced to 0.6 p. p. m. In runs of seventy-one hours, duration no permanent loss of catalyst activity was detectable.

Example 9

A catalyst identical to that described in Example 2 was charged to the glass converter described in Example 8. The catalyst bed was heated to 350° C. and a mixture composed of 75% hydrogen and 25% carbon disulfide vapor was passed over the catalyst at a rate of about 500 ml. per minute. The sulfiding was continued until hydrogen sulfide (a product resulting from the hydrogenation of the carbon disulfide) appeared in the off-gas.

After the catalyst had been sulfided, a mixture of crude benzene and hydrogen as described in Example 8 was passed over the catalyst at a temperature of 350° C. and at a space velocity of 200 to 350 volumes per minute with respect to the benzene. The condensed benzene contained 0.3 p. p. m. of sulfur.

*Example 10*

The catalyst described in Example 3 was charged to the equipment described in Example 8. The catalyst was sulfided then tested in the same manner as that described in Example 8. The effluent benzene contained 1.2 p. p. m. of sulfur as determined by total combustion of the benzene.

*Example 11*

The catalyst described in Example 4 was charged to the equipment described in Example 8 and then was sulfided by the procedure also described in Example 8. After the catalyst had been sulfided, a mixture composed of vaporized benzene (containing 200 p. p. m. of thiophene and 200 p. p. m. of carbon disulfide) and 20% hydrogen was passed over the catalyst at 350° C. and at a space velocity of 216 volumes per minute with respect to the benzene. After passing through the converter, the effluent benzene was analyzed for total sulfur by the total combustion method. Sulfur content of the effluent benzene was determined thereby to be 2.0 p. p. m.

*Example 12*

The catalyst described in Example 5 was charged to the equipment described in Example 8 then was sulfided according to the procedure also described in Example 8. After the catalyst had been sulfided, a mixture composed of vaporized benzene (containing 200 p. p. m. of thiophene and 10 p. p. m. of carbon disulfide) and 20% hydrogen was passed over the catalyst at 350° C. and at a space velocity of 220 volumes per minute with respect to the benzene. After passing through the converter, the effluent benzene was analyzed for thiophene content by the well-known isatin reagent method. Thiophene content of the effluent benzene was determined to be 30 p. p. m.

*Example 13*

The catalyst described in Example 6 was charged to the equipment described in Example 8 then was sulfided according to the procedure also described in Example 8. After the catalyst had been sulfided, a mixture composed of vaporized benzene (containing 220 p. p. m. of thiophene and 10 p. p. m. of carbon disulfide) and 20% hydrogen was passed over the catalyst at 350° C. and at a space velocity of 200 volumes per minute with respect to the benzene. After passing through the converter, the effluent benzene was analyzed for thiophene content by the isatin reagent method. Thiophene content of the effluent benzene was determined to be 15 p. p. m.

*Example 14*

A catalyst as described in Example 7 was charged to the equipment described in Example 8 then was sulfided according to the procedure also described in Example 8. After the catalyst had been sulfided, a mixture composed of vaporized benzene (containing 200 p. p. m. of thiophene and 190 p. p. m. of carbon disulfide) and 20% hydrogen was passed over the catalyst at 350° C. and at a space velocity of 140 volumes per minute with respect to the benzene. After passing through the converter, the effluent benzene was analyzed for sulfur content by the total combustion method. Sulfur content of the effluent benzene was determined to be 1.3 p. p. m.

*Example 15*

The catalyst described in Examples 1 and 8 was operated for a period of 18 hours during which time activity decreased from a level at which sulfur-removal was 99% effective at a space velocity of 834 volumes of benzene vapor per hour until activity was such that 99% sulfur-removal was not possible above 232 space velocity. At this level commercial application of the catalyst became uneconomical and regeneration to the initial high activity level was necessary. To regenerate the catalyst, benzene flow was stopped and a mixture composed of 75% hydrogen and 25% hydrogen sulfide was passed over the catalyst at about 350° C. and at a rate of 500 ml. per minute. The sulfiding was continued until hydrogen sulfide appeared in the off-gas alkaline cadmium chloride bubble bottle. When the hydrogen sulfide appeared in the exit gas, the hydrogen sulfide flow was stopped and then a mixture of benzene vapor and hydrogen was passed through the converter as described in Example 8. After regeneration, 99% sulfur-removal was again possible at space velocities in the range 600 to 800. Regeneration by this procedure was effective not only repeatedly on this catalyst but on other catalysts of the same type which were examined.

Other than the activated carbon supports used in the examples, any suitable support may be employed such, for example, as one of kieselguhr, infusorial earth, but preferably some form of activated carbon, and more particularly activated charcoal is used. The support is soaked by immersion in an ammoniacal or other solution of the salt until from 8 to 15% of the metal salt based on the original weight of the support is absorbed. This may be accomplished as is indicated in Example 1 by boiling the solution of the metal salt with a support or by any other suitable method of introduction.

The sulfiding of the thus supported catalyst may be carried out by using a variety of gaseous sulfiding agents. For example, gases containing hydrogen sulfide, carbon disulfide or the lower alkyl mercaptans are effective for this purpose. It appears to be immaterial relative to the effectiveness of the catalyst whether or not the sulfiding agent contains combined oxygen. The sulfiding operation should be carried out at temperatures in the range of 275° to 450° C. and preferably between 325° and 375° C. Moderate pressures may be used if desired.

Hydrogen sulfide, the preferred sulfiding agent, may be employed by passing a gas containing from 2 to 5 parts of hydrogen per part of hydrogen sulfide by volume over or through the particulate catalyst at a temperature between 300° and 450° C. and at a space velocity between 5 and 500 or even higher per hour. Alternatively, sulfiding of the catalyst can be effected with hydrogen sulfide alone, or a more rapid sulfiding and a more effective catalyst realized if hydrogen is present and is consumed in part at least in reducing the vanadate, chromate, molybdate, or tungstate. Evidence is available to indicate that the valence of the amphoteric metal is reduced during the sulfiding operation, although the invention is not to be limited in any way by such a theoretical consideration. The sulfiding operation whether conducted in solution or in the vapor phase is continued until no more sulfur is combined with the catalyst. This may be determined in the vapor phase hydrogen sulfide treatment by the appearance of hydrogen sulfide in the off-gas, while in the liquid phase operations it may be determined by a failure of the supported catalyst to absorb more of the sulfiding agent. The sulfided catalysts contain from 1 to 15% by weight, and preferably 3 to 10%, of combined sulfur.

These sulfided metal salts are very efficient for removing sulfur contaminants from hydrocarbon gases when the gases are passed over or through the catalyst at temperatures ranging between 300° and 500° C., and more particularly at temperatures between 325° and 375° C. The space velocity should range between 50 and 1000 volumes per hour and preferably between 300 and 800 volumes per hour. When operated at these rates and temperatures and under the preferred rates and temperatures, a hydrocarbon such as benzene highly contaminated with thiophene and organic sulfur can be purified to a gas containing less than 1 p. p. m. of sulfur.

The sulfur removal is carried out on a diluted hydrocarbon gas, a diluent being used that is capable of converting absorbed sulfur to hydrogen sulfide. Suitable diluents for this purpose may be hydrogen or gases containing easily available hydrogen. These gases may be present to the extent of from 10 to 30% by volume based on the hydrocarbon vapors.

Example 15 illustrates a preferred manner of reactivating the spent catalyst. Other methods of reactivation, however, may be used, and for this purpose the methods used for sulfiding the catalyst during its preparation are satisfactory for returning a spent catalyst to substantially its initial activity. Accordingly, hydrogen sulfide, carbon disulfide or the lower alkyl mercaptans may be used as the sufiding agents and the reactivating operation conducted with the catalyst in situ at temperatures ranging between 275 and 450° C. Pressures may or may not be used as desired.

The process of the invention is effective in removing thiophene from benzene or other hydrocarbon without undue decomposition, hydrogenation or otherwise altering the hydrocarbon. This selectivity is accomplished first, through the specific type of catalyst employed, and second, through its activity at temperatures sufficiently low to avoid decomposition, isomerization or hydrogenation. Moreover, when operating under the conditions above designated, the catalyst is effective in simultaneously removing other organic sulfur compounds such as carbon disulfide from the hydrocarbon. The carbon disulfide is removed, it is believed, by a process in which the organic sulfur is first converted to a metal sulfide of the catalyst, which sulfide is later reduced with hydrogen to form hydrogen sulfide. The function of the carbon or other support appears to absorb the organic sulfur compound and thereby facilitate its reaction with the catalyst to form metallic sulfides.

I claim:

1. In a process for the removal of sulfur contaminants from a hydrocarbon, the step which comprises passing a vaporized hydrocarbon containing sulfur contaminants over a sulfided salt of a metal of the group consisting of alkaline earth metals, metals of the iron group and silver, and an amphoteric metal of the group consisting of vanadium, chromium, molybdenum, and tungsten which has been prepared by deposition of the salt on a porous support and passing through the supported salt, and in the presence of hydrogen, a vaporized sulfide of the group consisting of hydrogen sulfide, carbon disulfide and lower alkyl mercaptans.

2. The process of claim 1 in which the catalyst is supported on activated carbon.

3. The process for the removal of sulfur-containing compounds from benzene which comprises passing vaporized benzene containing sulfur contaminants over sulfided nickel molybdate which has been prepared by a deposition of nickel molybdate on a porous support and passing over the supported nickel molybdate a gaseous mixture containing hydrogen and a vaporized sulfide of the group consisting of hydrogen sulfide, carbon disulfide and a lower alkyl mercaptan until hydrogen sulfide appears in the off-gas.

4. The process of claim 3 in which the catalyst is supported on activated carbon.

ALVIN B. STILES.

REFERENCES CITED

The following references are of record in the file of this patent:

UNITED STATES PATENTS

| Number | Name | Date |
| --- | --- | --- |
| 2,105,665 | Lazier et al. | Jan. 18, 1938 |
| 2,325,033 | Byrns | July 27, 1943 |
| 2,325,034 | Byrns | July 27, 1943 |
| 2,332,276 | Stahly | Oct. 19, 1943 |
| 2,388,959 | Drew | Nov. 13, 1945 |
| 2,413,312 | Cole | Dec. 31, 1946 |
| 2,426,483 | Boucher et al. | Aug. 26, 1947 |
| 2,455,713 | Voorhies | Dec. 7, 1948 |
| 2,481,300 | Engel | Sept. 6, 1949 |